United States Patent
Doering et al.

(10) Patent No.: US 6,634,984 B1
(45) Date of Patent: Oct. 21, 2003

(54) METHOD OF CONTROLLING ENGINE IDLE SPEED DURING LAUNCH FROM NEUTRAL IDLE OPERATION

(75) Inventors: Jeffrey Allen Doering, Canton, MI (US); Bradley Dean Riedle, Northville, MI (US); Ronald Thomas Cowan, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 09/779,815

(22) Filed: Feb. 8, 2001

(51) Int. Cl.⁷ .......................... B60K 41/04; B60K 41/02
(52) U.S. Cl. ...................................... 477/107; 477/181
(58) Field of Search .............................. 477/107, 111, 477/113, 116, 181; 701/54

(56) References Cited

U.S. PATENT DOCUMENTS

| | | | |
|---|---|---|---|
| 4,476,745 A | 10/1984 | Moan .......................... 74/866 |
| 4,526,065 A | 7/1985 | Rosen et al. .................. 74/869 |
| 5,123,302 A * | 6/1992 | Brown et al. ................. 74/866 |
| 5,213,186 A * | 5/1993 | Murata ..................... 192/0.052 |
| 5,272,630 A | 12/1993 | Brown et al. ............. 364/424.1 |
| 5,437,253 A * | 8/1995 | Huffmaster et al. ......... 123/399 |
| 5,484,351 A * | 1/1996 | Zhang et al. ............... 477/113 |
| 5,580,331 A * | 12/1996 | Shiraishi et al. ............. 477/109 |
| 5,738,605 A * | 4/1998 | Fliearman et al. .......... 477/108 |
| 5,738,606 A * | 4/1998 | Bellinger .................... 477/111 |
| 5,765,528 A * | 6/1998 | Kamimaru ............. 123/339.19 |
| 5,795,262 A | 8/1998 | Robinson ...................... 477/92 |
| 5,885,187 A * | 3/1999 | Tabata ........................ 477/107 |
| 5,929,533 A * | 7/1999 | Streib .................. 123/339.1 X |
| 6,067,494 A * | 5/2000 | Noda et al. .................... 701/54 |
| 6,098,004 A * | 8/2000 | Gryzelius et al. ........ 477/120 X |
| 6,188,943 B1 * | 2/2001 | Uchida et al. .......... 477/107 X |
| 6,266,597 B1 * | 7/2001 | Russell et al. .......... 477/107 X |
| 6,278,926 B1 * | 8/2001 | Jain et al. ...................... 701/58 |
| 6,434,467 B1 * | 8/2002 | O'Neil et al. ........... 477/110 X |

* cited by examiner

*Primary Examiner*—Roger Pang
(74) *Attorney, Agent, or Firm*—John F. Buckert; Allan J. Lippo

(57) ABSTRACT

A method of controlling engine idle speed in a motor vehicle having an internal combustion engine and multi-ratio transmission when launched from a neutral idle rest condition. At neutral idle, the transmission is controlled such that the input and output members are decoupled. During vehicle launch from neutral idle operation, two different strategies may be employed to control engine idle speed. One preferred method is to determine a feedforward or predicted torque converter load as a function of time. Another preferred method is to determine the feedforward or predicted torque converter load by comparing a maximum engine brake torque and the torque capacity of the forward clutch at any given time. Irrespective of the particular method used, other engine torque loads are added to the feedforward or predicted torque converter load to determine the engine output torque required to control engine idle speed and provide a smooth between transmission operating modes throughout the launch period.

24 Claims, 5 Drawing Sheets

|  | REV | FWD | DIR | LO/REV | 5CL | 2/4 BAND | HB & REV BAND | 1-4GR OWC |
|---|---|---|---|---|---|---|---|---|
| 1st |  | X |  | X |  |  | HB | X |
| 2nd |  | X |  |  |  | X | HB | X |
| 3rd |  | X | X |  |  |  | HB | X |
| 4th |  | X |  |  |  | X | HB | X |
| 5th |  |  | X |  | X | X |  |  |
| REV | X |  |  | X |  |  | REV |  |

METHOD OF CONTROLLING ENGINE IDLE SPEED DURING LAUNCH FROM NEUTRAL IDLE OPERATION

FIELD OF THE INVENTION

This invention relates in general to a method of controlling engine idle speed in an automotive vehicle. More particularly, this invention relates to a method of controlling engine idle speed when the transmission's forward clutch is engaged upon releasing the service brakes during launch from neutral idle operation.

BACKGROUND OF THE INVENTION

Neutral idle operation of a vehicle can be initiated when a vehicle is brought to a stand still position with the engine still running, as when a vehicle is stopped at a traffic light. In such situations, the transmission can be disengaged, i.e., neutral idle operation, which is beneficial to decrease overall vehicle fuel consumption by unloading the engine.

More technically speaking, neutral idle operation of a vehicle is generally characterized by (i) the vehicle being at rest, (ii) the service brakes applied, (iii) the gear select lever in a forward range, and (iv) all combinations of torque transmitting clutches that establish a speed ratio from the input to the output member of the transmission being disengaged. As a result, during neutral idle operation, the transmission input shaft rotates freely at a substantially synchronous speed with the engine output shaft.

When a vehicle begins to move after being held stationary, it is said that the vehicle is launching from neutral idle operation. One method of launching from neutral idle operation is for the vehicle operator to merely cease applying the service brakes and allow the vehicle to creep forward. The inventors herein have recognized that this type of slow launch from neutral idle operation sometimes causes the vehicle to exhibit undesirable noise, vibration, and harshness (NVH) during the launch. The undesirable NVH is primarily a result of the engine speed changing during the launch from neutral idle to accommodate and react to the increased engine load of the transmission upon re-engagement. Specifically, as the transmission's clutch pressure increases or decreases, the torque load on the vehicle's torque converter turbine, and therefore also on the impeller, also increases or decreases. As a result, the transmission's forward clutch begins to slowly engage to transfer the engine torque through the transmission, and the vehicle begins to slowly creep ahead. However, because conventional methods of engine speed control regulate the engine speed based on an assumption that the transmission is either in a "Drive" or "Neutral" mode of operation (as opposed to a partial mode in between "Drive" and "Neutral"), the engine speed control system tends to respond unevenly throughout the launch period. This is because the engine speed control system is reacting to the slowly increasing load on the engine.

Until recently, the NVH that results from the changing engine speed when the transmission engages has been relatively acceptable, primarily because vehicle operators have come to expect a certain amount of NVH when they physically move the vehicle's gear shifter from "Neutral" (or "Park") to a "Drive" position. However, because neutral idle operation is typically initiated by the vehicle itself, without the vehicle operator physically moving the gear shifter, the NVH that results from conventional engine speed control methods is more noticeable and undesirable.

SUMMARY OF THE INVENTION

The present invention relates to an improved method of controlling engine idle speed during launch from neutral idle operation. The present invention is particularly useful for minimizing undesirable noise, vibration, and harshness during a relatively slow launch from neutral idle operation, when the NVH is more noticeable to the vehicle operator. The present invention controls engine idle speed during launch by determining a "feedforward engine torque" required to maintain a constant engine idle speed when launching from neutral idle operation. The feedforward engine torque is an estimated engine torque that is predicted to be required at a time in the future during the launch. The feedforward engine torque is calculated by the vehicle's microprocessor based on an event that occurred in the drivetrain, such as the operator releasing the service brakes to begin engagement of the forward clutch. When the vehicle operator releases the service brakes, it is assumed that the vehicle is launching from neutral idle operation. The vehicle's microprocessor then controls the engine speed based upon the calculated feedforward engine torque. As a result of the present invention, the increased torque demands from the re-engagement of the transmission are anticipated, and the engine speed can be controlled proactively instead of reactively, as in the prior art. The proactive engine speed control minimizes the NVH common in prior art systems.

The feedforward engine torque required to maintain a constant engine idle speed is determined by one of two preferred methods. In the first preferred method, the commanded or measured clutch pressure is used to estimate the torque capacity of the forward clutch at any given time throughout the launch period using a mathematical predictive model. Using this preferred method, the torque capacity of the forward clutch is estimated at various times based upon certain operating parameters, such as clutch pressure. In addition, a maximum torque converter load is determined based on the engine speed and other transmission variables, such as transmission fluid temperature, clutch design, and the like. The torque converter load when the clutch is fully engaged (turbine speed equal to zero) is imposed as an upper limit on the estimation of the maximum torque converter load. Then, a feedforward or predicted torque converter load is determined by comparing the maximum torque converter load and the torque capacity of the forward clutch.

In the second preferred method, the feedforward torque converter load is determined by a predetermined mathematical function. Specifically, the feedforward torque converter load at any given time can be determined purely as a function of time based on the engine speed, the turbine speed, and other transmission variables, such as transmission fluid temperature, clutch design, and the like. Using this second preferred method, a predicted turbine speed can be estimated based on its current rate of change. Either of the preferred methods will result in a reduction of NVH compared to prior art methods.

Various objects and advantages of this invention will become apparent to those skilled in the art from the following detailed description of the preferred embodiments, when read in light of the accompanying drawings.

DETAILED DESCRIPTION OF PREFERRED EMBODIMENTS

Figure 1:
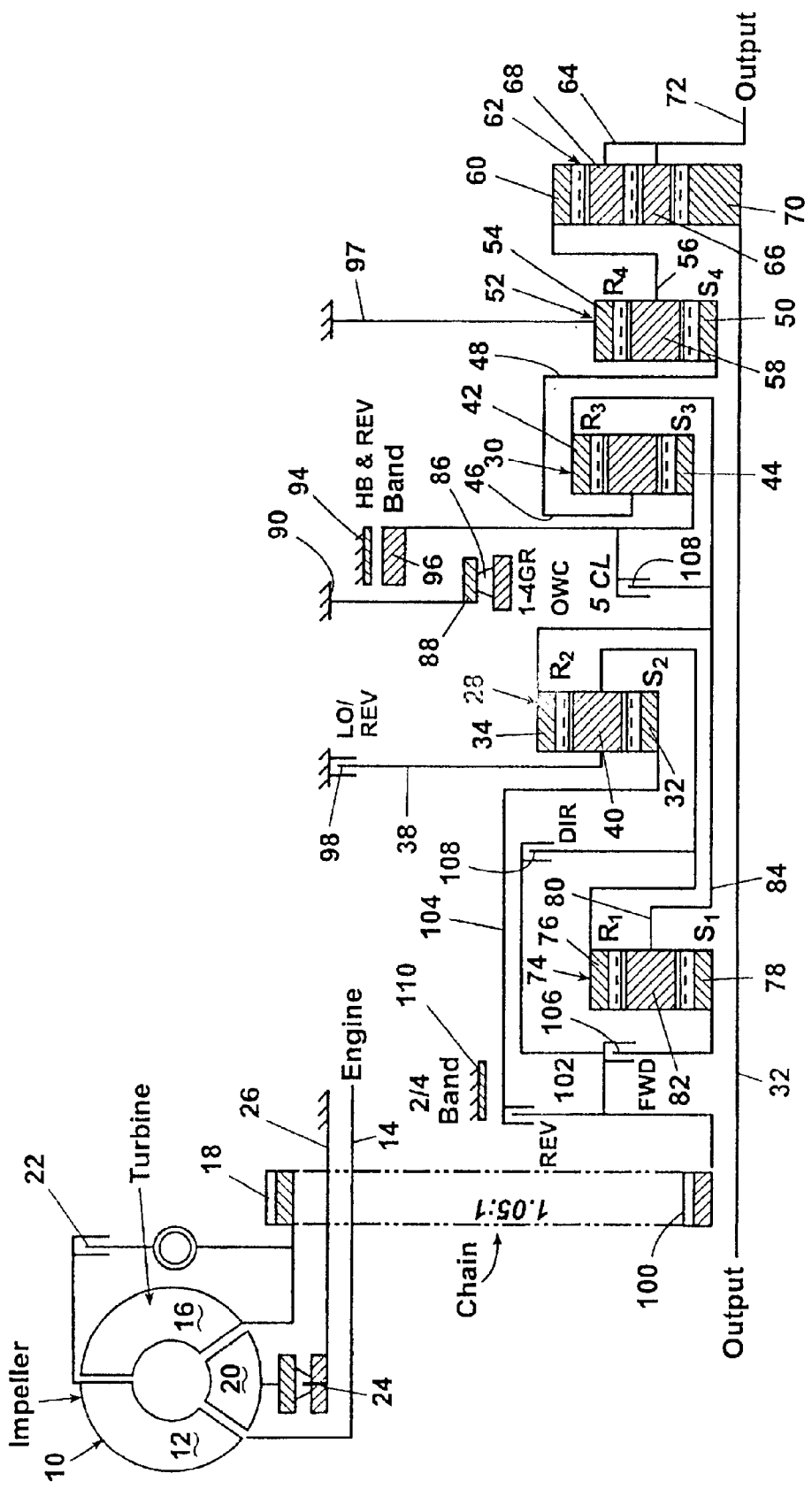
FIG. 1 is a schematic representation of a planetary gear transmission having a forward clutch located in the torque flow path between the hydrokinetic torque converter turbine and the input elements of the gearing.

Referring now to the drawings, there is illustrated in FIG. 1, a hydrokinetic torque converter, shown generally at 10, includes a bladed impeller 12 connected drivably to a vehicle engine crankshaft 14. A bladed turbine 16 is connected to drive sprocket 18 of a chain transfer drive. A bladed stator 20 is located between the toroidal flow exit section of the turbine of the turbine flow entrance section of the impeller and acts in known fashion to change the direction of the toroidal fluid flow, thus making possible a torque multiplication in the torque converter 10.

During steady-state operation in higher gear ratios, a friction bypass clutch 22 may be engaged to drivably connect the impeller 12 and the turbine 16, thus effectively removing the hydrokinetic torque flow path from the driveline. Stator 20 is anchored against rotation in a direction opposite to the direction of rotation of the impeller by an overrunning brake 24, which is grounded to stator sleeve shaft 26.

A pair of simple planetary gear units 28 and 30 is rotatably mounted about the axis of output shaft 32 that is arranged in spaced parallel disposition with respect. to the engine crankshaft axis. Unit 28 includes ring gear 34, sun gear 36, carrier 38 and planet pinions 40 that are journalled on carrier 38 in meshing engagement with ring gear 34 and sun gear 36. Gear unit 30 comprises ring gear 42, sun gear 44, carrier 46 and planet pinions 48, which are journalled on carrier 46 in meshing engagement with sun gear 44 and ring gear 42.

Carrier 46 forms a torque output element for the gearing and is drivably connected to output member 48, which is connected to final drive sun gear 50 of final drive planetary gear unit 52.

Final drive gear unit 52 includes, in addition to sun gear 50, a ring gear 54, a carrier 56 and planet pinions 58 journalled on carrier 56 in meshing engagement with sun gear 50 and ring gear 54. Carrier 56 acts as a torque output element of the gear unit 52 and is connected to ring gear 60 and differential gear unit 62.

A compound carrier 64 forms a part of the gear unit 62 that rotatably journals a first pair of pinions 66, which mesh with a ring gear 60 and with a second set of planetary pinions 68, the latter meshing with sun gear 70. Sun gear 70 in turn is drivably connected to output shaft 32.

Carrier 64 is drivably connected to a companion torque output shaft 72. Shaft 32 is connected to one traction wheel of the vehicle, and the opposite traction wheel of the vehicle is connected to output shaft 72. The connections between the traction wheels and the respective output shafts are achieved by universal coupling and half shaft assemblies in a known fashion.

A third simple planetary gear unit 74 is located between the pair of gear units previously described and the hydrokinetic torque converter. It comprises a ring gear 76, a sun gear 78, a carrier 80 and planet pinions 82 journalled on the carrier 80 in meshing engagement with ring gear 76 and sun gear 78. Carrier 80 is connected to torque transfer sleeve shaft 84, which is drivably connected to ring gear 34 of gear unit 28 and to ring gear 42 of gear unit 30. An overrunning brake 86 that has an outer race 88 grounded to the transmission housing as shown at 90 is adapted to anchor sun gear 44 during operation in each of the first four overdriving ratios, thus providing a torque reaction point for the gear system. Ring gear 54 is permanently anchored to the housing as shown at 92, thus permitting the final drive gear unit 52 to multiply the torque delivered through the gear units 74, 28 and 30 in each of the driving ratios.

A friction brake band 94 surrounds brake drum 96 which, in turn, is connected to sun gear 44. The brake band 94 is applied to anchor the sun gear 44 during hill braking operation and during reverse-drive operation.

A disc brake shown generally at 98 is adapted to anchor the carrier 38 against the transmission housing during operation in the lowest ratio and in reverse drive. Sun gear 36 is a torque input-element flow transmission. During operation in reverse drive, sun gear 36 is connected to driven sprocket 100 by means of reverse clutch 102, the latter acting as a driving connection between the driven sprocket 100 and brake drum 104. Sun gear 36 is connected directly to the brake drum 104. Driven sprocket 100 is connected to driving sprocket 18 through a torque transfer drive chain 106. During forward drive operation, drive sprocket 100 is connected to sun gear 78 by forward drive clutch 106. The forward drive clutch 106 is engaged during operation in the first three forward-driving ratios.

A direct-drive clutch 108 connects ring gear 76 with the driven sprocket 100 during operation in the third and fourth forward driving ratios as well as during the fifth driving ratio. When direct drive clutch 108 and the forward clutch 106 are engaged simultaneously, ring gear 76 is connected to sun gear 78 so that the elements of the gear unit 74 rotate in unison with a one-to-one speed ratio.

To effect a fifth forward-driving ratio, friction clutch 109 is applied, thus establishing a driving connection between sleeve shaft 84 and sun gear 44 of gear unit 30 to lock sun gear 44 to ring gear 42 so that the speed ratio developed by gear unit 30 is unity.

The neutral idle feature of the invention is achieved by controlling engagement and release of forward clutch 106. When the vehicle is at a standstill and the engine is idling, the engine 10 will tend to drive the turbine because of the hydrokinetic torque multiplication effect of the converter 10. Thus, a driving torque will be delivered to the traction wheels through the gearing, even when the engine is idling.

In prior art designs, it is necessary to maintain the accelerator pedal at a sufficiently advanced position so that the engine will idle at a speed that will avoid undue engine harshness. It further is necessary for the vehicle operator to maintain his foot on the vehicle brake to avoid creeping of the vehicle with the engine idling. By disengaging the clutch 106 to establish a neutral idle condition, the torque flow path to the traction wheel is interrupted when the engine is idling with the vehicle at a standstill.

Figures 2, 4:
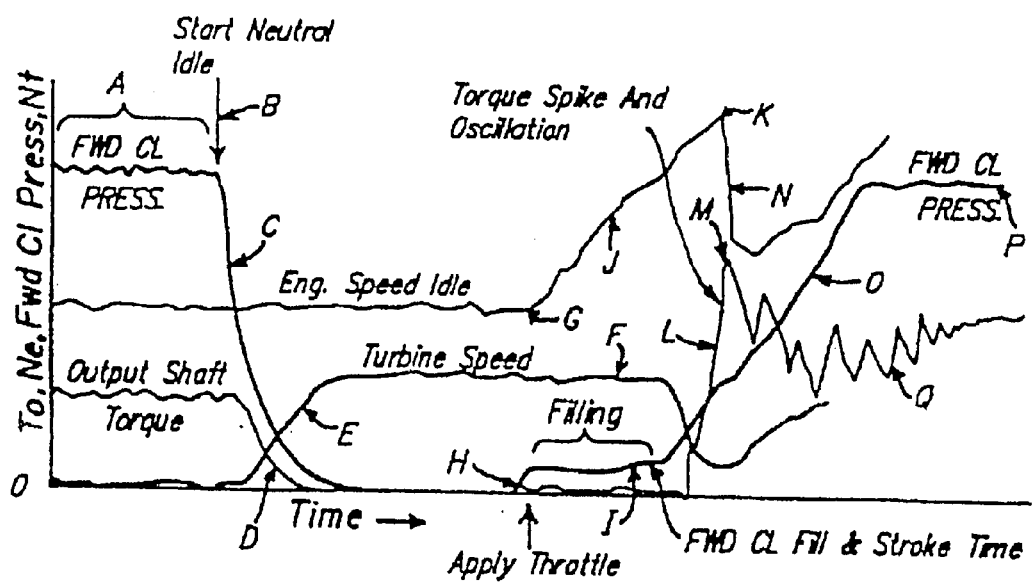
FIG. 2 is a chart that shows a clutch and brake engagement and release pattern for the transmission shown in FIG. 1.
FIG. 4 is a graph that shows output torque and clutch pressure changes as well as the engine speed and turbine speed changes during a neutral idle condition and during a subsequent engagement of the forward clutch for a typical transmission of the kind shown in the prior art references.

FIG. 2 shows a chart that indicates the clutches and the brakes that are applied and released to establish each of the five forward-driving ratios as well as the reverse ratio. The sun gear 36 is anchored by a second and fourth ratio brake band 110. That brake band is applied also during fifth ratio operation so that sun gear 36 may act as a reaction point as the ring gear 34 is overdriven and as torque is delivered to the gear unit 28 through the carrier 38 and through the direct-drive clutch 108. In FIG. 2, the forward-drive clutch 106 is designated as clutch FWD, the direct-drive clutch 108 is designated as clutch DIR, the reverse disc brake 98 is referred to as the LO/REV brake, the fifth ratio clutch 109 is identified as 5CL clutch, and brake band 110 is identified as 2/4 band.

First ratio drive is achieved by engaging brake band 94, which anchors sun gear 44. Also, disc brake 98 is applied, and forward clutch 106 is applied. Thus, sun gear 78 is connected to the driven sprocket at 100, and the underdriven motion imparted to the carrier 80 is transferred to the ring gear 42 of gear unit 30. In FIG. 2, brake band 94 is referred to as the HB and REV band. The reverse clutch 102 is identified in FIG. 2 as the REV clutch.

Figure 3:
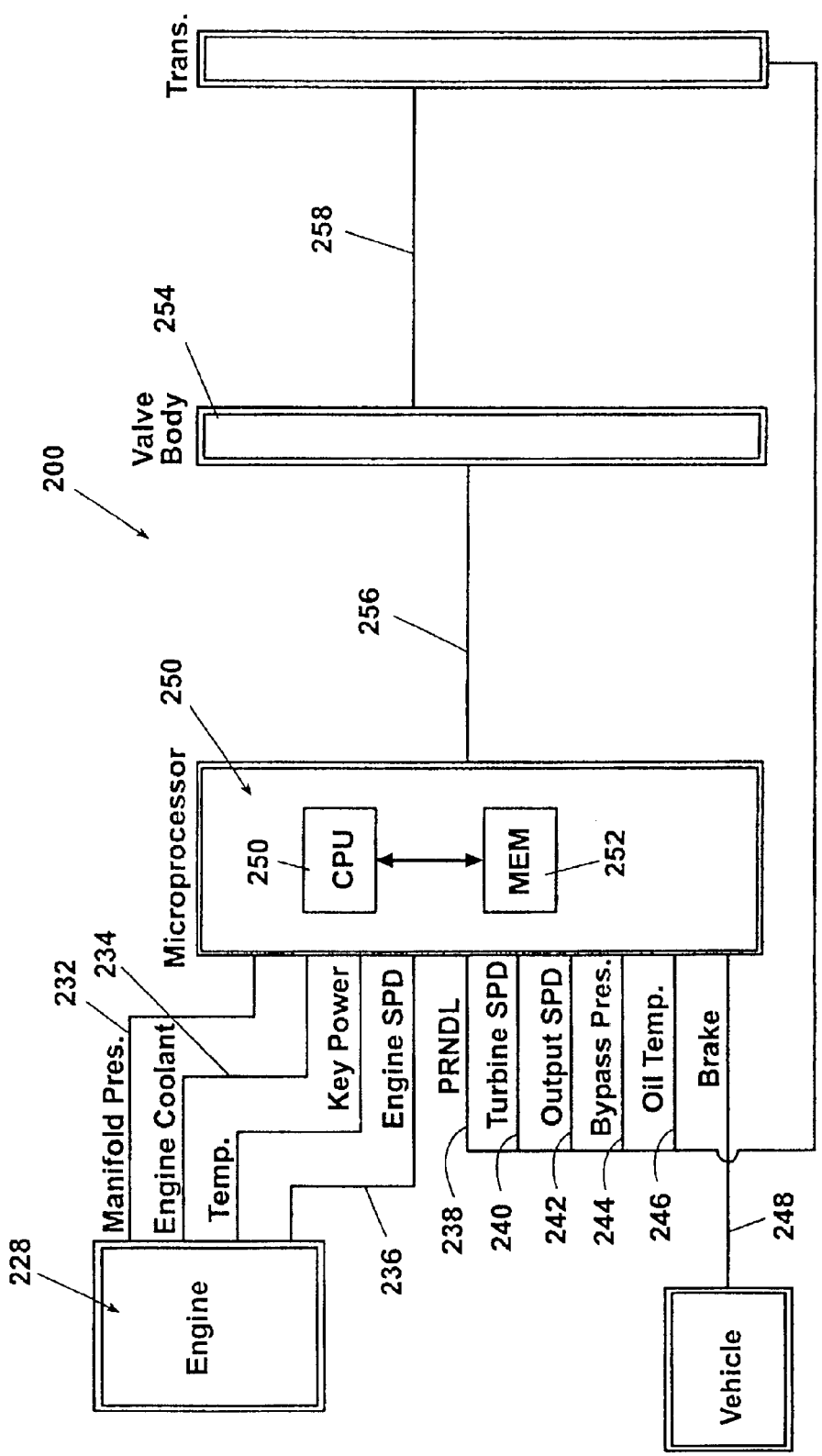
FIG. 3 is a schematic representation of the control system including the electronic microprocessor for controlling clutch engagement in a closed-loop fashion.

A schematic representation of a microprocessor control system, shown generally at 200, is shown in FIG. 3. The engine is generally designated by reference numeral 228. Operating variables for the engine, such as manifold pressure and coolant temperature and engine speed, are measured by analog sensors and distributed to an electronic microprocessor 230. The signal passage for manifold pressure is shown at 232. The engine coolant temperature signal is distributed to the processor 230 through signal line 234. The engine speed signal is distributed to the processor 230 through line 236.

Other variables that are measured and distributed to the processor are a signal indicating the range selection or transmission manual valve position. This signal is distributed through signal passage 238. Turbine speed also is measured, and that value is distributed to the processor through signal line 240. The torque output shaft speed for the transmission is distributed to the processor through signal line 242. A bypass clutch pressure signal is distributed to the processor through signal line 244, but that signal is irrelevant to the present invention. Transmission oil temperature for the engine is measured, and the signal representing that value is distributed to the processor through signal line 246. A brake signal is distributed to the processor through signal line 248. The presence of a signal at line 248 will indicate whether the vehicle brakes are applied or released by the vehicle operator.

The processor 230 will receive the information developed by the sensors and condition it so that it may be used in digital form by the central processor unit. The central processor unit identified at 250 processes the information delivered to the processor 230 in a manner that will be described subsequently using algorithms that are stored in memory 252. The output signals from the processor 230 are delivered to a valve body 254 through signal line 256. The output data includes shift signals delivered to the shift solenoids that control the ratio changes. The operation of the valve body 254 and the solenoid signals are described in commonly-assigned U.S. Pat. No. 5,272,630, herein incorporated by reference. The output signal developed by the valve body 254 delivered through signal line 258 controls the operation of the clutches and brakes of the transmission illustrated in FIG. 1.

For purposes of describing the benefits of the present invention, a comparison to prior art neutral idle characteristics will first be made with reference to FIG. 4, which shows the prior art neutral idle clutch characteristics for a transmission having an open loop-type converter. This type of transmission is further described in commonly-assigned U.S. Pat. No. 5,272,630. In FIG. 4, time is plotted on the abscissa; and output shaft torque, clutch fluid pressure, engine speed and turbine speed are plotted on the ordinate. The forward clutch pressure, the engine speed, the turbine speed and the output shaft torque assume initially the values shown in region A of FIG. 4.

It is seen from FIG. 4 that the turbine speed is zero since the vehicle is at rest. The difference between engine speed and turbine speed represents the slip that exists when the vehicle comes to rest and before the neutral idle mode begins. At time B, the neutral idle mode is initiated, which results in an exhaust of pressure from the forward clutch. This results in a decay of the forward clutch pressure over a short period of time, as indicated by the curve C in FIG. 4. The output shaft torque decays, as shown by curve D, as the forward clutch pressure is relieved.

As the forward clutch looses capacity following initiation of a neutral start mode, the turbine speed will increase, as shown at E, until it reaches the normal turbine speed for engine idle, which may be 600 rpm as shown at F in FIG. 4. The engine speed at that time in a typical vehicle installation may be about 800 rpm as shown at G.

FIG. 4 illustrates at point H what happens, according to the prior art, when the operator terminates the neutral idle mode by advancing the accelerator pedal. An immediate increase in the forward clutch pressure then will occur until a transition pressure indicated at I is reached. It is during this interval that the clutch servo cylinder is filling and the clutch servo piston is stroking. Because the engine throttle is advanced, the engine speed will respond to the advancing throttle and will increase as shown by the ramp J in FIG. 4. The engine speed continues to increase until the clutch servo is fully stroked. At that time, the engine speed will have reached a peak value shown at K.

When the piston for the forward clutch servo is stroked and the forward clutch gains capacity, the output shaft torque will sharply rise, as indicated by the steep slope curved portion L, until it reaches a peak value shown at M. The achievement of the peak value M is coincident generally with the peak engine speed, the latter immediately decreasing in value at a fast rate, as shown at N. The decreasing engine speed is accompanied by a substantial inertia torque that contributes to the achievement of the peak value M for the output shaft torque. The clutch pressure will continue to increase following the stroking of the clutch servo piston and progressively increase at a rapid rate, as shown by the curve O, until a final clutch pressure value is reached, as shown at P. The output shaft torque will be subjected to torque fluctuations, as demonstrated by the oscillating torque values Q following clutch engagement. The control strategy of the present invention that avoids these undesirable features of the prior art will now be explained with reference to FIG. 5.

Figure 5:
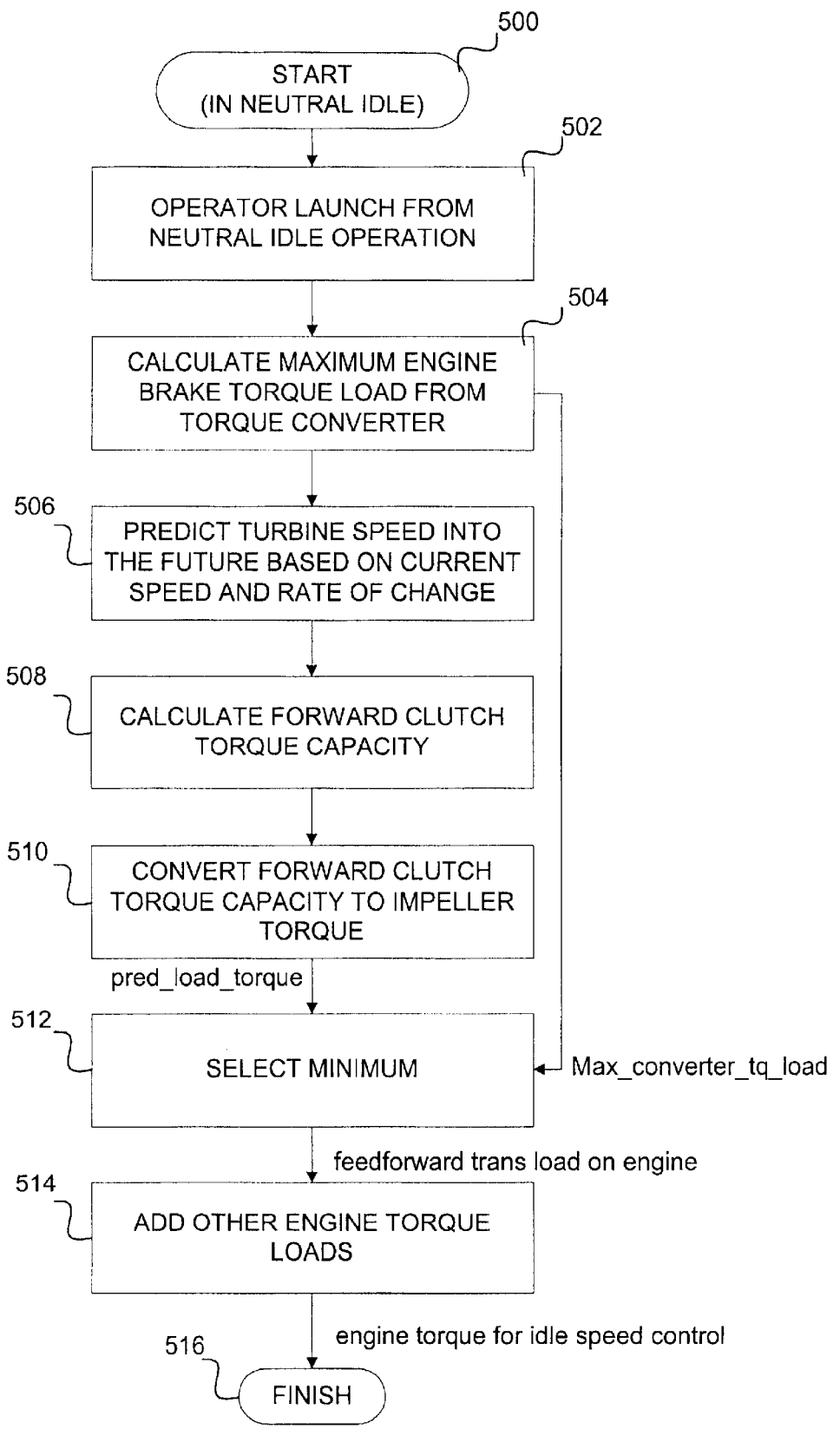
FIG. 5 is flow diagram of controlling engine idle speed during neutral idle operation according to a first method of the invention.

Referring now to FIG. 5, the first preferred routine executed by microprocessor 230 for controlling engine idle speed during launch from neutral idle operation will now be described. The vehicle begins in the neutral idle operating condition (step 500). As described above, the neutral idle operating condition results in an exhaust of pressure from the forward clutch at time B in FIG. 4. This results in a decay of the forward clutch pressure over a short period of time, as indicated by the curve C in FIG. 4. The output shaft torque decays, as shown by curve D, as the forward clutch pressure is relieved. As the forward clutch loses capacity following initiation of a neutral start mode, the turbine speed will increase, as shown at E, until it reaches the normal turbine speed for engine idle, which may be 600 rpm as shown at F in FIG. 4. The engine speed at that time in a typical vehicle installation may be about 800 rpm as shown at G.

At some point after being maintained in neutral idle operation for a period of time, the vehicle operator releases the service brakes (step 502). Though the present invention can be used in connection with a variety of types of launches from neutral idle, the present invention is particularly useful in situations where the vehicle operator does not immediately depress the accelerator pedal to terminate neutral idle operation, as shown at H in FIG. 4. Rather, the vehicle operator merely allows the vehicle to creep forward, which results in a relatively slow engagement of the transmission.

According to the present invention, the engine idle speed during launch can be controlled by predicting a feedforward engine torque and then controlling the engine speed based upon that prediction. The feedforward engine torque is that predicted engine torque that is expected to be necessary to accommodate the increased torque required by the re-engaging transmission at a point in time in the near future. As used herein, the term "load" is a generic term that represents the amount of torque that the transmission exerts on the engine at a given time.

According to the first preferred embodiment of the invention, the predicted required engine torque is limited to the minimum of an estimated torque converter load when the forward clutch is fully engaged (i.e., turbine speed equal to zero) and the predicted torque required by the re-engaging transmission. This is done to allow the forward clutch to engage at a desired rate while preventing excessive clutch slippage and engine flare. Therefore, the maximum torque converter load is calculated (step 504) according to the following expression:

$$Max_{13}\ Converter\_Tq\_Load = Fn\_Conv\_Load\ (Ne, Nt, other\ transmission\ variables),$$

where,

Ne is the engine speed,

Nt is the turbine speed and is assumed equal to zero, and $Fn_{13}$ Conv_Load converts engine speed and turbine speed to engine brake torque independent of whether the forward clutch is engaged. Fn_Conv_Load is a function of engine speed, turbine speed and other transmission variables, such as transmission fluid temperature, temperature of the friction plates, slip across the clutch, clutch design, and the like. Fn_Conv_Load is easily determined by one skilled in the art from relationships known to the skilled practitioner, namely the torque ratio function, Fn_Conv, and a relationship that relates engine speed to the impeller torque. The relationship between engine speed and impeller torque, otherwise known as the K-factor, can be expressed as:

$$K\left(\frac{Turbine\ Speed}{Engine\ Speed}\right) = \frac{Engine\ Speed}{\sqrt{Impeller\ Torque}}$$

The numerical values for the K-factor can be determined empirically by one skilled in the art. The above equation can be rearranged as follows:

$$Impeller\ Torque = \left(\frac{Engine\ Speed}{K\left(\frac{Turbine\ Speed}{Engine\ Speed}\right)}\right)^2$$

The above equation exemplifies that the impeller torque can be determined based on engine speed and turbine speed. It will be appreciated that the determination of Fn_Conv_Load may be further refined by one of skill in the art by taking into account other transmission variable, such as transmission fluid temperature, temperature of the friction plates, slip across the clutch, clutch design, and the like.

Then, a predicted future turbine speed, Nt_Pred, is calculated based on the current turbine speed and a rate of change of the turbine speed (step 506), according to the following expression:

$$Nt\_Pred = max(Nt + Nt\_Rate\_Of\_Change * Time\_Into\_Future, 0)$$

Next, as shown in step 508, the torque capacity of the forward clutch at any given time throughout the launch period is calculated using the following equation:

$$Forward\_Clutch\_Torque\_Capacity = Fn\_Cap\ (clutch\ pressure, other\ transmission\ variables)$$

where,

Fn_Cap converts either a commanded or measured forward clutch pressure into a torque capacity. Fn_Cap is a function of clutch pressure and other transmission variables, such as transmission fluid temperature, temperature of the friction plates, slip across the clutch, clutch design, and the like. Fn_Cap includes a conversion factor from torque measured at the forward clutch to torque measured at the turbine shaft and can be expressed as:

$$Fn\_Cap = m * Clutch\_Pressure - b$$

where, m and b are constants that are determined empirically by one skilled in the art.

Then, a feedforward or predicted torque converter load is determined (step 510) by the following expression:

$$Pred\_Load\_Torque = Forward\_Clutch\_Torque\_Capacity / Fn\_Conv(Nt\_Pred/Ne)$$

where,

Fn_Conv is the torque multiplication or ratio of the torque converter. Fn_Conv can be determined by one skilled in the art by plotting the torque ratio (turbine torque/engine torque) as a function of the speed ratio (turbine speed/engine speed). The numerical values for turbine speed and torque, and engine speed and torque can be determined empirically by one skilled in the art.

Next, the feedforward or predicted torque converter load is limited to the lesser of the maximum torque converter load and the predicted torque converter load (step 512). In terms of a mathematical expression, the predicted torque converter load is expressed as follows:

$$Conv\_Tq\_Load\_Predicted = min(Max\_Converter\_Tq\_Load, Pred\_Load\_Torque)$$

Then, the actual engine torque for controlling engine idle speed is determined by adding any other engine torque loads to the feedforward or predicted torque converter load (step 514). Examples of other engine torque loads include, but are not limited to, engine accessories, such as air conditioning, pumps, and the like. Finally, the vehicle microprocessor determines whether the vehicle's launch from neutral idle is complete. If so, the algorithm ends (step 516). If not, then steps 502–514 are repeated.

Figure 6:
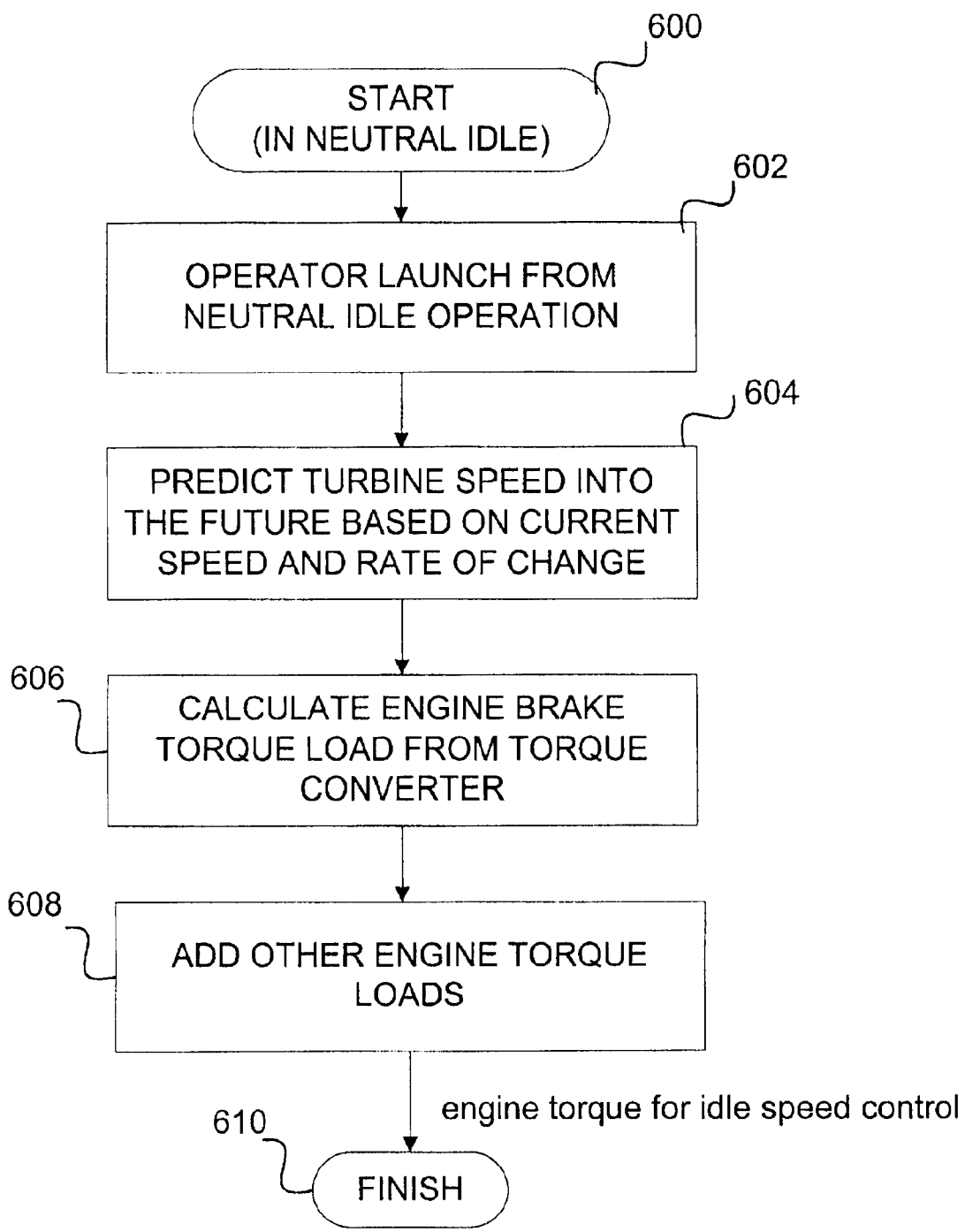
FIG. 6 is flow diagram of controlling engine idle speed during neutral idle operation according to a second method of the invention.

Referring now to FIG. 6, a second preferred method of the invention will now be described. As in the first preferred method, the vehicle begins in the neutral idle operating condition (step 600). At some point, the vehicle operator releases the service brakes (step 602) and allows the vehicle to creep forward, thereby causing the transmission to re-engage relatively slowly.

Then, as in the first preferred embodiment, a feedforward turbine speed, Nt_Pred, is predicted at a time in the future based on a current turbine speed and a rate of change of the turbine speed (step 604). The same expression as in the first preferred embodiment is used here:

$$Nt\_Pred=max(Nt+Nt\_Rate\_Of\_Change*Time\_Into\_Future,0)$$

Unlike the first preferred embodiment though, the second preferred method calculates the feedforward or predicted torque converter load in a continuous loop using the following expression (step 606):

$$Conv\_Tq\_Load\_Predicted=Fn\_Conv\_Load(Ne, Nt\_Pred, Other\ Transmission\ Variables)$$

where,

Ne is the engine speed,

Nt_Pred=max(Nt+Nt_Rate_Of_Change*Time_Into_Future,0), and

Fn_Conv_Load is identical to the mathematical function having the same name described in connection with the first preferred embodiment. The Fn_Conv_Load function converts engine speed and turbine speed to engine brake torque independent of whether the forward clutch is engaged and is a function of engine speed, turbine speed and other transmission variables, such as transmission fluid temperature, clutch design, and the like.

After the feedforward or predicted torque converter load is calculated, the actual engine torque required to control engine idle speed is determined by adding any other engine torque loads to the feedforward or predicted torque converter load (step 608). Examples of other engine torque loads include, but are not limited to, engine accessories, such as air conditioning, pumps, and the like. Then, the microprocessor 230 determines whether the launch from neutral idle is complete. If so, the algorithm ends (step 610). If not, then steps 602–608 are repeated.

Unlike the first preferred embodiment of the invention, in the second method of the invention, the torque capacity of the forward clutch is not predicted and converted to an impeller torque as in steps 508 and 510 of the first method of the invention. Rather, the feedforward or predicted torque converter load is determined in a continuous loop.

Irrespective of which of the preferred methods are used, the present invention maintains a constant engine idle speed during launch and provides a smooth transition between transmission operating modes. This is accomplished by predicting the feedforward torque converter load to control engine torque throughout the launch period, unlike conventional methods. Then, the engine speed can be controlled by adjusting certain engine operating parameters, such as fuel injection amounts, air intake amounts, and other parameters known to those of skill in the art.

Preferred embodiments of the present invention have been disclosed. A person of ordinary skill in the art would realize, however, that certain modifications would come within the teachings of this invention. For example, the teachings of this invention apply when a different clutch other than the forward clutch or identified as the forward clutch is allowed to slip during neutral idle operation. More particularly, without limiting the generality of the foregoing, parameters from the reverse clutch of the vehicle may be used, instead of the forward clutch, to control the engine output a torque. Therefore, the following claims should be studied to determine the true scope and content of the invention.

What is claimed is:

1. A method of controlling a vehicle having an engine coupled to a transmission through a clutch, comprising the steps of:

determining a predicted torque converter load based on a clutch torque capacity during launch from neutral idle operation; and adjusting an engine operating parameter to move an actual engine output torque towards said predicted torque converter load to maintain an engine speed during said launch.

2. The method of claim 1, further comprising the step of choosing a lesser of the predicted torque converter load and a maximum engine brake torque load.

3. The method of claim 1, wherein said clutch is a forward clutch.

4. The method of claim 1, wherein the clutch is a reverse clutch.

5. The method of claim 1, wherein the engine operating parameter comprises a fuel injection amount.

6. The method of claim 1, wherein the engine operating parameter comprises an air intake amount.

7. A method of controlling engine idle speed in a vehicle, comprising the steps of:

determining a predicted torque converter load during launch from neutral idle operation; and controlling engine torque output based on said predicted torque converter load.

8. The method of claim 7, wherein the predicted torque converter load is based on estimations of a clutch torque capacity.

9. The method of claim 8, wherein said clutch is a forward clutch.

10. The method of claim 8, wherein said clutch is a reverse clutch.

11. The method of claim 7, wherein the engine torque output at a given time is limited to the lesser of said predicted torque converter load and a maximum engine brake load.

12. A method of controlling engine idle speed during launch from neutral idle operation comprising the steps of:

determining a maximum engine brake torque load;

determining a predicted torque converter load; and adjusting an engine operating parameter to limit output engine torque to the lesser of said maximum engine brake torque load and said predicted torque converter load.

13. The method of claim 12, wherein the predicted torque converter load is based on estimations of a clutch torque capacity.

14. The method of claim 13, wherein said clutch is a forward clutch.

15. The method of claim 13, wherein said clutch is a reverse clutch.

16. A system for transferring power from a vehicle engine during launch from neutral idle operation, comprising:

a transmission including a torque input shaft, a torque output shaft, and a gear mechanism adapted to establish a torque flow path between the torque input shaft and the torque output shaft;

a forward clutch for connecting the torque input shaft to the gear mechanism; and a microprocessor for determining a predicted torque converter load and controlling engine output torque based on said predicted torque converter load.

17. The system of claim 16, wherein said predicted torque converter load is based on a clutch torque capacity.

18. The method of claim 17, wherein said clutch is a forward clutch.

19. The method of claim 17, wherein said clutch is a reverse clutch.

20. The method of claim 16, wherein said engine output torque is limited by selecting the lesser of said predicted torque converter load and a maximum engine brake torque load.

21. A method for controlling a vehicle having an engine coupled to a transmission, the transmission having a torque converter operably associated with a clutch, the clutch controlling torque transfer to a vehicle axle, the method comprising:

determining a predicted torque converter load when changing an operational pressure of the clutch; and adjusting an engine output torque towards the predicted torque converter load to substantially maintain a speed of the engine.

22. The method of claim 21, wherein the determining step includes:

determining an amount of torque the clutch can transfer at a predetermined clutch operational pressure; and calculating the predicted torque converter load based on said amount of torque the clutch can transfer.

23. A method for controlling a vehicle having an engine coupled to a transmission, the transmission having a torque converter operably associated with a transmission clutch, the method comprising:

estimating a future torque converter load to be applied to the engine when moving the clutch toward an engaged operational position; and adjusting an engine output torque toward the estimated torque converter load to substantially maintain a speed of the engine.

24. A method for controlling a vehicle having an engine coupled to a transmission, the transmission having a torque converter operably coupled to a transmission clutch, the method comprising:

estimating a future torque converter load when transitioning the transmission between neutral idle operation and forward drive operation; and increasing an engine output torque toward the predicted torque converter load to substantially maintain a speed of the engine during the transition.

* * * * *